US012753676B2

(12) United States Patent
Tsuji et al.

(10) Patent No.: US 12,753,676 B2
(45) Date of Patent: Oct. 6, 2026

(54) APPARATUS FOR INJECTING CARBON DIOXIDE INTO UNDERGROUND, METHOD FOR EVALUATING SAME, AND METHOD FOR PRODUCING SAME

(71) Applicant: KYUSHU UNIVERSITY, NATIONAL UNIVERSITY CORPORATION, Fukuoka (JP)

(72) Inventors: Takeshi Tsuji, Fukuoka (JP); Shigenori Fujikawa, Fukuoka (JP)

(73) Assignee: KYUSHU UNIVERSITY, NATIONAL UNIVERSITY CORPORATION, Fukuoka (JP)

( * ) Notice: Subject to any disclaimer, the term of this patent is extended or adjusted under 35 U.S.C. 154(b) by 591 days.

(21) Appl. No.: 18/270,754

(22) PCT Filed: Dec. 27, 2021

(86) PCT No.: PCT/JP2021/048454
§ 371 (c)(1),
(2) Date: Jul. 3, 2023

(87) PCT Pub. No.: WO2022/149515
PCT Pub. Date: Jul. 14, 2022

(65) Prior Publication Data

US 2024/0060397 A1 Feb. 22, 2024

(30) Foreign Application Priority Data

Jan. 5, 2021 (JP) ................................ 2021-000342

(51) Int. Cl.

| | |
|---|---|
| ***E21B 41/00*** | (2006.01) |
| ***B01D 53/22*** | (2006.01) |
| ***B65G 5/00*** | (2006.01) |

(52) U.S. Cl.
CPC .......... *E21B 41/0064* (2013.01); *B01D 53/22* (2013.01); *B01D 2257/504* (2013.01)

(58) Field of Classification Search
CPC ............................ E21B 41/0064; B01D 53/22
See application file for complete search history.

(56) References Cited

U.S. PATENT DOCUMENTS 2,623,596 A * 12/1952 Whorton ................ E21B 43/18 166/266
5,261,490 A 11/1993 Ebinuma
(Continued)

FOREIGN PATENT DOCUMENTS

JP 2010-22957 A 2/2010
JP 2012-519587 A 8/2012
(Continued)

OTHER PUBLICATIONS

Saudi Arabia Office Action for Saudi Arabia Application No. 523441477, dated Apr. 30, 2025, with English translation.
(Continued)

*Primary Examiner* — Amber R Anderson
*Assistant Examiner* — Stacy N Lawson
(74) *Attorney, Agent, or Firm* — Birch, Stewart, Kolasch & Birch, LLP

(57) ABSTRACT

An object of the present invention is to provide an apparatus for injecting carbon dioxide into underground capable of capturing carbon dioxide from the atmosphere and injecting it into underground in a harmless state and at a low cost, the apparatus including: a capturing unit configured to concentrate carbon dioxide directly from the atmosphere and capture concentrated carbon dioxide as a mixture gas; and an injection well connected to the capturing unit for pressurizing the mixture gas and injecting the mixture gas into an underground reservoir, in which the capturing unit adjusts a
(Continued)

proportion of carbon dioxide in the mixture gas to 25% by volume or more.

14 Claims, 1 Drawing Sheet

(56) References Cited

U.S. PATENT DOCUMENTS

| | | | | |
|---|---|---|---|---|
| 9,205,372 | B2 | 12/2015 | Wright et al. | |
| 9,586,759 | B2 | 3/2017 | De Koeijer et al. | |
| 9,764,279 | B2 | 9/2017 | Jin et al. | |
| 2007/0215350 | A1* | 9/2007 | Kresnyak | F23C 9/00 166/305.1 |
| 2011/0030957 | A1 | 2/2011 | Constantz et al. | |
| 2011/0091955 | A1 | 4/2011 | Constantz et al. | |
| 2011/0315386 | A1* | 12/2011 | Dusseault | E21B 41/0064 166/305.1 |
| 2013/0064604 | A1* | 3/2013 | Han | E21B 33/10 405/53 |
| 2015/0010357 | A1* | 1/2015 | De Koeijer | E21B 41/0064 405/53 |
| 2016/0298425 | A1 | 10/2016 | Thrash | |
| 2018/0171768 | A1 | 6/2018 | Tiffany, III et al. | |
| 2021/0121826 | A1* | 4/2021 | Kolodji | B01D 53/226 |

FOREIGN PATENT DOCUMENTS

| | | | |
|---|---|---|---|
| JP | 2014-66690 | A | 4/2014 |
| JP | 5462786 | B2 | 4/2014 |
| WO | WO 2009/061187 | A2 | 5/2009 |
| WO | WO 2010/102385 | A1 | 9/2010 |

OTHER PUBLICATIONS

Japanese Office Action for Japanese Application No. 2022-574020, dated Oct. 21, 2025, with English translation.

Fujikawa et al., "A new strategy for membrane-based direct air capture," Polymer Journal, vol. 53, 2021, pp. 111-119.

International Preliminary Report on Patentability and Written Opinion of the International Searching Authority for International Application No. PCT/JP2021/048454, dated Jul. 4, 2023, with an English translation.

International Search Report and Written Opinion of the International Searching Authority for International Application No. PCT/JP2021/048454, dated Mar. 8, 2022.

United Arab Emirates Office Action for United Arab Emirates Application No. P6001701/2023, dated Dec. 16, 2024.

* cited by examiner

[Fig. 1]
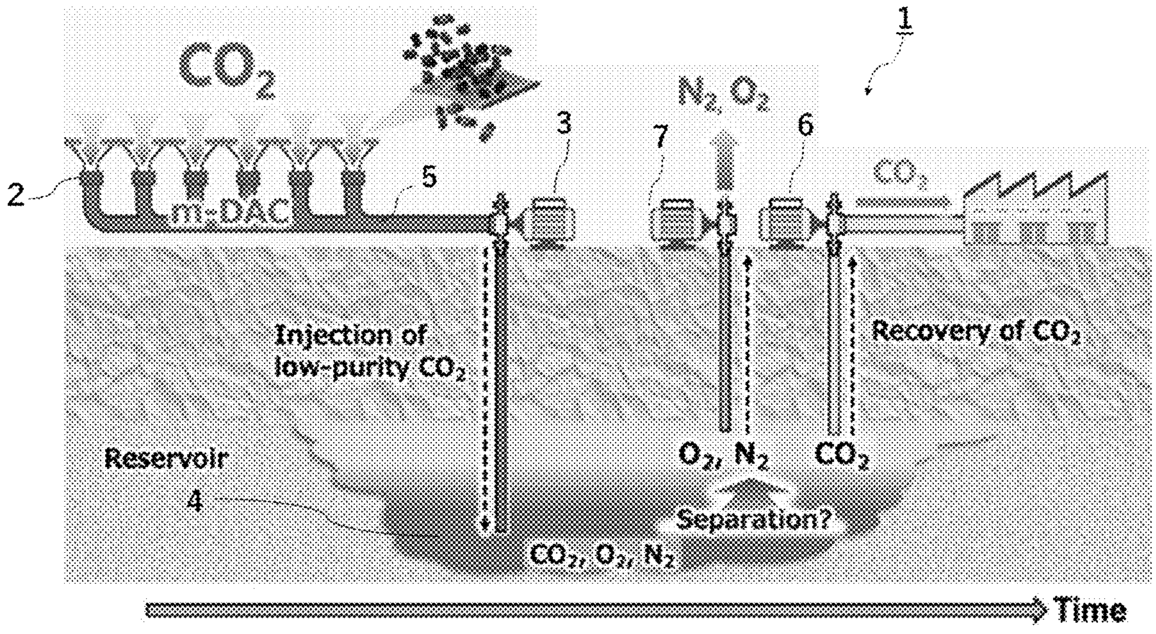
[Fig. 2]
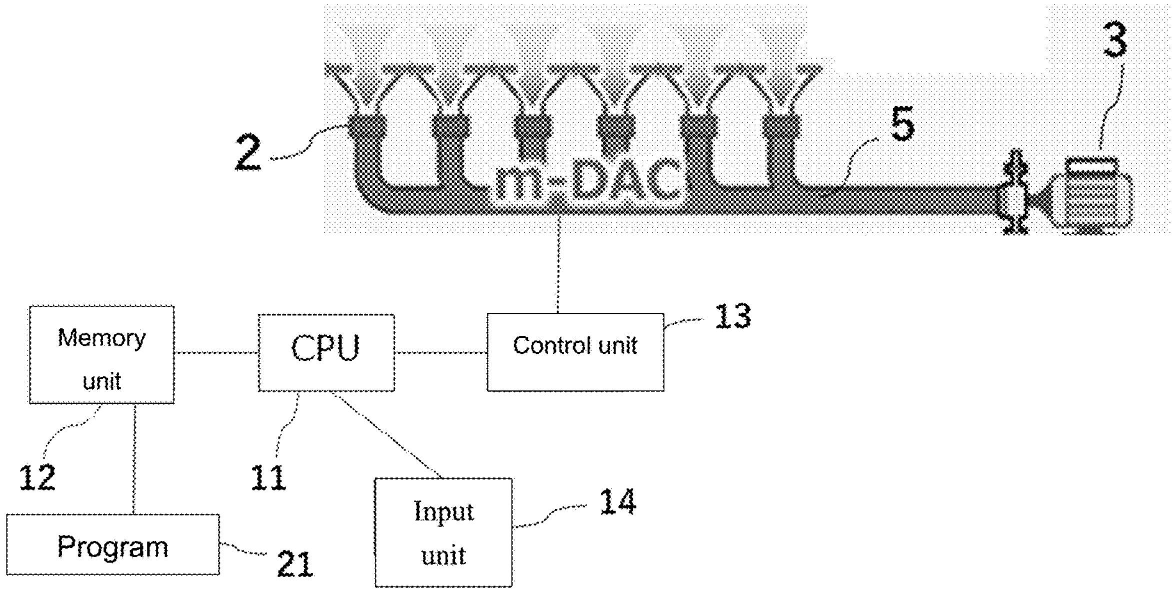

APPARATUS FOR INJECTING CARBON DIOXIDE INTO UNDERGROUND, METHOD FOR EVALUATING SAME, AND METHOD FOR PRODUCING SAME

TECHNICAL FIELD

The present invention relates to an apparatus for injecting carbon dioxide into underground, a method for evaluating an apparatus for injecting carbon dioxide into underground, and a method for producing an apparatus for injecting carbon dioxide into underground.

BACKGROUND ART

Reducing the atmospheric concentration of carbon dioxide, which is a major greenhouse gas emitted by humankind, has been required from the viewpoint of global warming countermeasures. Technologies for reducing carbon dioxide emissions into the atmosphere and technologies for using natural energy such as solar power generation systems are known as such methods. However, it is expected that these technologies alone will not be able to achieve the level of Japan's carbon dioxide reduction target set in the Paris Agreement of "−26.0% compared to the 2013 level by 2030 (−25.4% compared to the 2005 level)." Therefore, attention is being paid to a technology (negative emission technology) for recovering and removing carbon dioxide that was emitted in the past and accumulated in the atmosphere. As a realistic negative emission technology, there is a demand for the development of carbon dioxide capture and storage (CCS) technology that captures carbon dioxide directly from concentrated sources or the atmosphere and stores it in a geological formation.

Other than directly capturing carbon dioxide from the atmosphere, technologies for injecting carbon dioxide into underground are known (see, for example, Patent Documents 1 to 3).

Patent Document 1 discloses an apparatus and a method for mainly detecting the location of leakage of carbon dioxide to the surface of the earth at an early stage in order to intermittently or continuously detect leakage from the underground storage of carbon dioxide containing or added with hydrogen at a rate of 0.01% to 1% stored underground by inserting an open-bottomed pipe for 0.05 to 20 m from the surface of the earth into the soil or bedrock layer or placing an open-bottomed container on the surface of the earth to retain gas leaking from the underground reservoir in a pipe or a vessel and allowing a hydrogen gas concentration sensor to suck or directly contact the internal air layer to intermittently or continuously measure the hydrogen gas concentration.

Patent Document 2 discloses a process for sequestration of a water-soluble fluid within a subsurface water-laden formation, the process comprising:

- a step of selecting a target water-laden geological formation;
- a step of providing a wellbore of a fluid injection well into the formation, the wellbore comprising at least one opening to discharge fluid into the formation;
- a step of providing a source of the fluid, the source in communication with the injection well; and
- a step of injecting the fluid into the formation from the injection well under conditions of temperature or pressure, or both temperature and pressure, selected to cause the fluid to enter the formation and rise within the formation with sufficient volume, flow rate and density contrast between the fluid and water within the formation to induce a convection current of the fluid and water within the formation, the convection current sufficient to enhance convective mixing of the fluid and the water, relative to fluid injected under conditions which do not induce a convection current.

In Patent Document 2, carbon dioxide is exemplified as the fluid.

Patent Document 3 discloses a system for removing carbon dioxide from the atmosphere to reduce global warming which can increase availability of renewable energy or non-fuel products such as fertilizers and construction materials, which forms a part of a global thermostat, wherein the global thermostat includes a plurality of the systems distributed on the earth, the plurality of the systems regulates the amount of CO2 in the atmosphere and hence functions by regulating the greenhouse effect caused by carbon dioxide and other gas emissions, and each of the systems is a combination of: an air extraction system that captures carbon dioxide from the atmosphere through a medium and removes carbon dioxide from the medium; and a capturing system that isolates the removed carbon dioxide to a location for at least one of sequestration, storage, and generation of a renewable carbon fuel or non-fuel products such as fertilizers and construction materials, wherein the combination specifically includes:

an air contactor unit that passes atmospheric air through the medium for capturing carbon dioxide from the atmosphere, in which the medium includes a pancake shaped porous substrate that supports an adsorbent for carbon dioxide on its surface, is capable of extracting $CO_2$ from the atmosphere, and has a relatively large area compared to its thickness in the air flow direction; and a regeneration/$CO_2$ extraction unit for regenerating the medium by separating and capturing carbon dioxide from the medium at the location for at least one of sequestration, storage, and generation of a renewable carbon fuel or non-fuel products such as fertilizers and construction materials such that the medium can capture further $CO_2$ from the atmosphere, which uses one or more energy sources that supply process heat to the regeneration/$CO_2$ extraction unit to remove carbon dioxide from the medium and can regenerate it for continued use, and which employs steam from process heat at temperatures below 120° C., and wherein the one or more energy sources are selected from the group of primary energy sources consisting of: fossil fuel, geothermal, nuclear, solar, biomass, and other renewable energy sources and exothermic chemical processes whose use can result in a supply of process heat

PRIOR ART DOCUMENTS

Patent Documents

Patent Document 1: JP Patent Publication No. 2014-66690 A

Patent Document 2: JP Patent Publication No. 2012-519587 A

Patent Document 3: Japanese Patent No. 5462786

SUMMARY OF INVENTION

Object to be Solved by the Invention

Meanwhile, Patent Documents 1 to 3 neither disclose nor suggest capturing carbon dioxide from the atmosphere and injecting it into underground in a harmless state and at a low cost.

Patent Document 1 describes in the Examples that a mixture gas containing 49.5% carbon dioxide was injected into an outdoor field consisting of granite. However, Patent Document 1 does not describe capturing carbon dioxide directly from the atmosphere. There is the problem that the mixture gas contains hydrogen, which can be harmful. In addition, in Patent Document 1, the reservoir depth is shallow, which does not intend to store carbon dioxide under pressure near a supercritical state for a small volume and a low cost.

Patent Document 2 does not describe concentrating and capturing carbon dioxide directly from the atmosphere.

Patent Document 3 describes isolating carbon dioxide to yield high purity. The system disclosed in Patent Document 3 is a system with a high capturing cost. In addition, Patent Document 3 does not describe specific numerical values for the concentration of carbon dioxide.

An object of the present invention is to provide an apparatus for injecting carbon dioxide into underground which is capable of capturing carbon dioxide from the atmosphere and injecting it into underground in a harmless state and at a low cost.

Means for Solving the Object

An apparatus that combines the technology of directly concentrating and capturing carbon dioxide from the atmosphere and the technology of underground storage of low-purity carbon dioxide has remained unknown. In general, high-purity carbon dioxide and low-purity carbon dioxide (mixed with nitrogen and oxygen) are completely different in a pressurized state (e.g., a supercritical state). In the first place, it was unclear whether low-purity carbon dioxide could be stored underground.

As a conventional apparatus for injecting carbon dioxide into underground, an apparatus equipped with a capturing unit that directly captures carbon dioxide from the exhaust gas of factories, steelworks, and thermal power plants is known. However, the captured carbon dioxide mainly contains harmful substances such as NOx and SOx.

In addition, the "Order for Enforcement of the Law Concerning Prevention of Marine Pollution, Etc. and Maritime Disasters" stipulates the following criteria for a gas that can be disposed of under the seafloor in the case of carbon dioxide: "the concentration of carbon dioxide contained in the gas is 99% by volume or more (or 98% by volume or more in a case in which the gas was captured by using the method prescribed in the preceding item for the production of hydrogen used in the refining of petroleum)." Therefore, in a conventional apparatus for injecting carbon dioxide into underground, underground storage of carbon dioxide having a low purity of less than 98% by volume has received little attention in Japan.

For a conventional apparatus for injecting carbon dioxide into underground, it was necessary to remove such harmful substances and increase the purity of carbon dioxide before underground storage, requiring a lot of energy and cost. Thus, as in Patent Document 3, a high-cost apparatus for isolating carbon dioxide to yield a high purity was required.

In view of the above, the present inventors found that even in the case of a mixture gas that is low-purity carbon dioxide, it is possible to pressurize the mixture gas into a supercritical state or the like under technically and economically feasible conditions (e.g., depth from the surface of the earth, temperature, and pressure), and significantly reduce the volume of the mixture gas (details of simulation results are omitted). Based on these novel findings, the present inventors first conceived that a technique for directly concentrating and capturing carbon dioxide from the atmosphere and a technique for injecting low-purity carbon dioxide into underground can be combined. This has led to the completion of the apparatus for injecting carbon dioxide into underground of the present invention.

Specifically, the present invention provides an apparatus for injecting carbon dioxide into underground comprising: a capturing unit configured to concentrate carbon dioxide directly from the atmosphere and capture concentrated carbon dioxide as a mixture gas; and an injection well connected to the capturing unit for pressurizing the mixture gas and injecting the mixture gas into an underground reservoir, It was found that in a first aspect, the capturing unit adjusts the proportion of carbon dioxide in the mixture gas to 25% by volume or more such that substances other than carbon dioxide become atmospheric components (harmless), which are nitrogen and oxygen, and the mixture gas can be efficiently stored in a small space by reducing the volume in a pressurized state or the like, thereby allowing carbon dioxide to be stored underground at a competitive cost. Thus, the above object has been solved.

It was further found that in a second aspect of the present invention, the apparatus comprises a CPU, a memory unit, and a control unit, in addition to a capturing unit and an injection well as in the first aspect, the CPU obtains the proportion of carbon dioxide in the mixture gas using a program stored in the memory unit such that a density of pressurized carbon dioxide in the reservoir based on a depth of the reservoir is within a predetermined range, a degree of concentration of carbon dioxide in the capturing unit is controlled so as to match the proportion of carbon dioxide in the mixture gas obtained by the control unit such that substances other than carbon dioxide become atmospheric components (harmless), which are nitrogen and oxygen, and the mixture gas can be efficiently stored in a small space by reducing the volume in a pressurized state or the like, thereby allowing carbon dioxide to be stored underground at a competitive cost. Thus, the above object has been solved.

The configuration of the present invention, which is a specific means for solving the above problems, and the preferred configuration of the present invention will be described below.

[1] An apparatus for injecting carbon dioxide into underground, comprising:
- a capturing unit configured to concentrate carbon dioxide directly from the atmosphere and capture concentrated carbon dioxide as a mixture gas; and
- an injection well for pressurizing the mixture gas and injecting the mixture gas into an underground reservoir, which is connected to the capturing unit,
- wherein the capturing unit adjusts a proportion of carbon dioxide in the mixture gas to 25% by volume or more.

[2] An apparatus for injecting carbon dioxide into underground, comprising:
- a capturing unit configured to concentrate carbon dioxide directly from the atmosphere and capture concentrated carbon dioxide as a mixture gas;

an injection well for pressurizing the mixture gas and injecting the mixture gas into an underground reservoir, which is connected to the capturing unit;

a CPU;

a memory unit; and a control unit, wherein the CPU obtains the proportion of carbon dioxide in the mixture gas using a program stored in the memory unit such that a density of pressurized carbon dioxide in the reservoir based on a depth of the reservoir is within a predetermined range, and a degree of concentration of carbon dioxide in the capturing unit is controlled so as to match the proportion of carbon dioxide in the mixture gas obtained by the control unit.

[3] The apparatus for injecting carbon dioxide into underground according to [1] or [2], wherein the capturing unit adjusts the proportion of carbon dioxide in the mixture gas to from 25% by volume or more to less than 95% by volume.

[4] The apparatus for injecting carbon dioxide into underground according to any one of [1] to [3], wherein the capturing unit concentrates carbon dioxide directly from the atmosphere using a gas separation membrane.

[5] The apparatus for injecting carbon dioxide into underground according to any one of [1] to [4], wherein a mixture fluid originating from the mixture gas is stored in a pore space inside a rock in the reservoir.

[6] The apparatus for injecting carbon dioxide into underground according to any one of [1] to [5], wherein the capturing unit is located in a non-residential area or a non-industrial area on the ground, and the reservoir is located at a depth of 1.5 km or more from the surface of the earth.

[7] The apparatus for injecting carbon dioxide into underground according to any one of [1] to [6], wherein the capturing unit is located on the sea, and the reservoir is located in a geological formation at a depth of 1.5 km or more from the sea surface.

[8] The apparatus for injecting carbon dioxide into underground according to any one of [1] to [7], wherein the density of pressurized carbon dioxide in the reservoir is from 50 to 500 $kg/m^3$.

[9] The apparatus for injecting carbon dioxide into underground according to any one of [1] to [8], wherein a horizontal distance between the capturing unit and the injection well is 500 m or less.

[10] The apparatus for injecting carbon dioxide into underground according to any one of [1] to [9], wherein the reservoir further comprises a monitoring unit that monitors a state of the mixture fluid originating from the mixture gas.

[11] The apparatus for injecting carbon dioxide into underground according to any one of [1] to [10], which further comprises a recovery unit configured to recover carbon dioxide from the reservoir.

[12] The apparatus for injecting carbon dioxide into underground according to any one of [1] to [11], wherein the mixture gas further contains nitrogen and oxygen, and a total proportion of carbon dioxide, nitrogen, and oxygen in the mixture gas is 99% by volume or more.

[13] The apparatus for injecting carbon dioxide into underground according to any one of [1] to [12], wherein the mixture gas further contains nitrogen and oxygen, and the total proportion of carbon dioxide, nitrogen, and oxygen in the mixture gas is 99% by volume or more, and the apparatus further comprises a release unit that releases oxygen and nitrogen from the reservoir to the atmosphere.

[14] A method for evaluating the apparatus for injecting carbon dioxide into underground according to any one of [1] to [13], comprising:

calculating the density of pressurized carbon dioxide in the reservoir so as to obtain storage efficiency of carbon dioxide based on the proportion of carbon dioxide in the mixture gas and the depth of the reservoir.

[15] A method for producing the apparatus for injecting carbon dioxide into underground according to any one of [1] to [13], comprising:

calculating a total cost of a cost for capturing the mixture gas in a case in which the capturing unit adjusts the proportion of carbon dioxide in the mixture gas to 99% by volume, a cost for transporting the mixture gas from the capturing unit to the injection well, and a cost for injecting the mixture gas, determining (1) the proportion of carbon dioxide in the mixture gas; (2) the horizontal distance between the capturing unit and the injection well; and (3) the depth of the reservoir so that the cost is equal to or less than the total cost.

Advantageous Effects of Invention

According to the present invention, an apparatus for injecting carbon dioxide into underground, which is capable of capturing carbon dioxide from the atmosphere and injecting it into underground in a harmless state and at a low cost, can be provided.

BRIEF DESCRIPTION OF DRAWINGS

FIG. 1 is a schematic diagram of an example of the apparatus for injecting carbon dioxide into underground of the present invention.

FIG. 2 is a schematic diagram of an example of the second aspect of the present invention.

EMBODIMENT OF CARRYING OUT THE INVENTION

The present invention will be described in detail below. Although the constituent features described below may be described based on representative embodiments and specific examples, the present invention is not limited to such embodiments. As used herein, a numerical range represented by "-" means a range including the numerical values described before and after "-" as lower and upper limits.

[Apparatus for Injecting Carbon Dioxide into Underground]

The apparatus for injecting carbon dioxide into underground in the first aspect of the present invention (also referred to as the "first aspect of the present invention") comprises a capturing unit configured to concentrate carbon dioxide directly from the atmosphere and capture concentrated carbon dioxide as a mixture, an injection well for pressurizing the mixture gas and injecting the mixture gas into an underground reservoir, which is connected to the capturing unit, wherein the capturing unit sets the proportion of carbon dioxide in the mixture gas to 25% by volume or more.

The apparatus for injecting carbon dioxide into underground in the second aspect of the present invention (also referred to as the "second aspect of the present invention") comprises a capturing unit configured to concentrate carbon dioxide directly from the atmosphere and capture concentrated carbon dioxide as a mixture,

- an injection well for pressurizing the mixture gas and injecting the mixture gas into an underground reservoir, which is connected to the capturing unit,
- a CPU;
- a memory unit; and
- a control unit,
- wherein the CPU obtains the proportion of carbon dioxide in the mixture gas using a program stored in the memory unit such that a density of pressurized carbon dioxide in the reservoir based on a depth of the reservoir is within a predetermined range, and
- the degree of concentration of carbon dioxide in the capturing unit is controlled so as to match the proportion of carbon dioxide in the mixture gas obtained by the control unit.

With these configurations, according to the present invention, an apparatus for injecting carbon dioxide into underground, which is capable of capturing carbon dioxide from the atmosphere and injecting it into underground in a harmless state and at a low cost, can be provided.

Preferred embodiments of the present invention will be described below.

<Overall Configuration>

The overall configuration of the apparatus for injecting carbon dioxide into underground of the present invention will be described with reference to the drawings.

FIG. 1 is a schematic diagram of an example of the apparatus for injecting carbon dioxide into underground of the present invention. In FIG. 1, the apparatus for injecting carbon dioxide into underground 1 is depicted such that time passes from the left side to the right side of the page. The overall configuration of an example of the apparatus for injecting carbon dioxide into underground 1 will be described along with the flow of each type of gas in order from the left side of the paper.

The apparatus for injecting carbon dioxide into underground 1 shown in FIG. 1 comprises capturing units 2 for concentrating carbon dioxide directly from the atmosphere and capturing concentrated carbon dioxide as a mixture gas. In FIG. 1, six capturing units 2 are arranged in parallel, but the arrangement is not limited to this example. A capturing unit 2 may comprise, for example, a carbon dioxide gas separation membrane (see the right side of the capturing unit 2 on the right end). First, a mixture gas 5 is captured from the atmosphere in a capturing unit 2.

The apparatus for injecting carbon dioxide into underground 1 shown in FIG. 1 comprises an injection well 3 for pressurizing a mixture gas 5 and injecting the mixture gas into an underground reservoir 4, which is connected to the capturing unit, The mixture gas 5 captured in the capturing unit 2 is transported from the capturing unit 2 to the injection well 3 and then injected from the injection well 3 into the reservoir 4.

The apparatus for injecting carbon dioxide into underground 1 shown in FIG. 1 further comprises a release unit 7 that release gases other than carbon dioxide (oxygen and nitrogen in FIG. 1) from the reservoir 4 to the atmosphere. The release unit 7 releases gases (oxygen and nitrogen) separated from a mixture fluid originating from the mixture gas 5 during long-term storage.

The apparatus for injecting carbon dioxide into underground 1 shown in FIG. 1 further comprises a recovery unit 6 that recovers carbon dioxide from the reservoir 4. Components of the mixture fluid originating from the mixture gas 5 stored in the reservoir 4 may separate in the reservoir during long-term storage. The recovery unit 6 recovers carbon dioxide separated during long-term storage. Preferably, the recovery unit 6 comprises a well (vertical well), equipment for processing or equipment for stockpiling (see a building of the recovery unit 6 in FIG. 1).

The apparatus for injecting carbon dioxide into underground 1 may further comprises a monitoring unit (not shown) that monitors a state of the mixture fluid originating from the mixture gas 5 in the reservoir 4.

FIG. 2 is a schematic diagram of an example of the second aspect of the present invention.

The apparatus for injecting carbon dioxide into underground shown in FIG. 2 comprises a capturing unit 2, an injection well 3, a CPU 11, a memory unit 12, and a control unit 13. In the apparatus, the CPU 11 obtains the proportion of carbon dioxide in the mixture gas 5 using a program 21 stored in the memory unit 12 such that the density of pressurized carbon dioxide in the reservoir 4 based on the depth of the reservoir 4 is within a predetermined range. Then, the degree of concentration of carbon dioxide in the capturing unit 2 is controlled so as to match the proportion of carbon dioxide in the mixture gas 5 obtained by the control unit 13.

The apparatus for injecting carbon dioxide into underground shown in FIG. 2 further comprises an input unit 14. Parameters such as the depth of the reservoir can be input from the input unit 14 and used for calculation by the CPU 11. Further, parameters such as the temperature and pressure of the injection well or reservoir and the proportions of non-carbon dioxide components of the mixture gas may be input.

The apparatus for injecting carbon dioxide into underground shown in FIG. 2 may have a different configuration similar to that of FIG. 1.

A preferred aspect of each part constituting the apparatus for injecting carbon dioxide into underground of the present invention will be described below.

<Capturing Unit>

The apparatus for injecting carbon dioxide into underground of the present invention comprises a capturing unit configured to concentrate carbon dioxide directly from the atmosphere and capture concentrated carbon dioxide as a mixture gas.

In the first aspect of the present invention, the capturing unit adjusts the proportion of carbon dioxide in the mixture gas to 25% by volume or more.

Meanwhile, in the second aspect of the present invention, the degree of concentration of carbon dioxide in the capturing unit is controlled so as to match the proportion of carbon dioxide in the mixture gas obtained by the control unit.

According to the present invention, in each aspect, the capturing unit adjusts the proportion of carbon dioxide in the mixture gas to preferably 30% by volume or more, more preferably 60% by volume or more, particularly preferably 80% by volume or more, further particularly preferably 90% by volume or more.

Meanwhile, as the proportion of carbon dioxide in the mixture gas increase, the density of pressurized carbon dioxide in the reservoir increases, which is preferable. However, by reducing the capturing cost according to the scale of the capturing unit and membrane separation performance, the cost of capturing the mixture gas, the cost of transportation from the capturing unit to the injection well, and the total storage cost may be reduced. In this case, a mixture gas containing lower-purity carbon dioxide can be stored, during which the proportion of carbon dioxide in the mixture gas in the capturing unit may be less than 99% by volume, less than 98% by volume, 95% by volume or less, 90% by volume or less, 75% by volume or less, 60% by volume or less, or 50% by volume or less.

In the apparatus for injecting carbon dioxide into underground of the present invention, it is preferable to determine especially the proportion of carbon dioxide in the mixture gas and the depth of the reservoir according to the "method for producing an apparatus for injecting carbon dioxide into underground" described later. Specific preferred aspects are preferred aspects (A), (B), and (C) of the present invention according to the proportion of carbon dioxide in the mixture gas.

In the preferred aspect (A) of the present invention, it is preferable that the capturing unit adjusts the proportion of carbon dioxide in the mixture gas to a low concentration of from 25% by volume or more to less than 50% by volume from the viewpoint of reducing the scale of the capturing unit and using a low-performance, low-cost gas separation membrane that directly concentrates carbon dioxide from the atmosphere to reduce the capturing cost. In the preferred aspect (A), to increase the density of pressurized carbon dioxide in the reservoir to store carbon dioxide in a supercritical state, the reservoir is located preferably in a geological formation present at a depth of 2.5 km or more from the surface of the earth or the sea surface (under the ground below the seafloor, meaning under the ground rather than under the sea), particularly preferably in a geological formation at a depth of 3.0 km or more therefrom. It is particularly preferable to store carbon dioxide in a supercritical state in a geological formation present at a depth of 2.5 km or more (preferably 3.0 km or more) from the sea surface. The influence of the decrease in the capturing cost due to the proportion of carbon dioxide in the mixture gas adjusted by the capturing unit to 25% by volume or more to less than 50% by volume is more significant than the increase in the cost of injecting carbon dioxide in a geological formation present at a depth of 2.5 km or more from the surface of the earth or the sea surface in such a manner, making it possible to reduce the total cost. Meanwhile, in this preferred aspect (A), the storage cost may be reduced by ensuring that the reservoir is located within a geological formation at a depth of 1.5 km or more from the surface of the earth or the sea surface in combination with forming carbon dioxide into microbubbles or nanobubbles by the capturing unit, the injection well, or an optional bubbling unit. Alternatively, the reservoir may be located in a geological formation at a depth of from 2.0 km or more to less than 2.5 km.

Microbubbles refer to air bubbles having a diameter of from 1 to 100 μm (ISO 20480-1:2017). Nanobubbles refer to bubbles having a diameter of from 10 nm to less than 1000 nm. Examples of means for forming carbon dioxide into microbubbles or nanobubbles that can be used include, but are not particularly limited to, known means such as the apparatus disclosed in JP 2009-112995 A (Paragraphs [0011] to [0071]).

In the preferred aspect (A) of the present invention, the capturing unit adjusts the proportion of carbon dioxide in the mixture gas to preferably from 30% by volume or more to less than 50% by volume, more preferably from 35% by volume or more to less than 50% by volume, particularly preferably from 40% by volume or more to less than 50% by volume.

In the preferred aspect (B) of the present invention, it is preferable that the capturing unit adjusts the proportion of carbon dioxide in the mixture gas to a moderate concentration of from 50% by volume or more to less than 75% by volume from the viewpoint of reducing the number of gas separation membranes that concentrate carbon dioxide directly from the atmosphere to reduce the capturing cost. In the case of concentrating carbon dioxide directly from the atmosphere using gas separation membranes, the proportion of carbon dioxide in the mixture gas is adjusted to less than 75% by volume, thereby achieving the maximum carbon dioxide concentration in practical use. In this preferred aspect (B), in order to increase the density of pressurized carbon dioxide in the reservoir to store carbon dioxide in a supercritical state, it is sufficient that the reservoir is located in a geological formation having a depth of 2.0 km or more from the surface of the earth or the sea surface, which allows a lower storage cost than that in the preferred aspect (A). The storage cost can be within a conventional range by injecting carbon dioxide in a geological formation having a depth of from 2.0 km to less than 2.5 km from the surface of the earth or the sea surface. Besides, the capturing unit adjusts the proportion of carbon dioxide in the mixture gas to from 50% by volume or more to less than 75% by volume. Accordingly, the capturing cost can also be lowered to some extent, reducing the total cost. Note that the storage efficiency may be further improved by injecting carbon dioxide in a perfect supercritical state by allowing the reservoir to be in a geological formation present at a depth of 2.5 km or more or 3.0 km or more from the surface of the earth or the sea surface. Meanwhile, in this preferred aspect (B), the storage cost may be reduced by ensuring that the reservoir is located within a geological formation at a depth of 1.5 km or more from the surface of the earth or the sea surface in combination with forming carbon dioxide into microbubbles or nanobubbles by the capturing unit, the injection well, or an optional bubbling unit. Alternatively, the reservoir may be located in a geological formation at a depth of from 2.0 km or more to less than 2.5 km.

In the preferred aspect (B) of the present invention, the capturing unit adjusts the proportion of carbon dioxide in the mixture gas to preferably from 55% by volume or more to less than 75% by volume, more preferably from 60% by volume or more to less than 75% by volume, particularly preferably from 65% by volume or more to less than 75% by volume.

In the preferred aspect (C) of the present invention, it is preferable that the capturing unit adjusts the proportion of carbon dioxide in the mixture gas to a high concentration of from 75% by volume or more to 100% by volume or less from the viewpoint of increasing the density of pressurized carbon dioxide in the reservoir, which is even a shallow reservoir, to allow carbon dioxide to be stored in a supercritical state, although the scale of the capturing unit is increased and a plurality of high-performance, expensive gas separation membranes are used for concentrating carbon dioxide directly from the atmosphere, resulting in a high capturing cost. In this case, it is sufficient that the reservoir is located in a geological formation having a depth of 1.5 km or more from the surface of the earth or the sea surface, which allows the storage cost to be significantly lower than that in either the preferred aspect (A) or (B) due to the storage record in the past.

In the preferred aspect (C) of the present invention, the capturing unit adjusts the proportion of carbon dioxide in the mixture gas to preferably from 80% by volume or more to 98% by volume or less, more preferably from 85% by volume or more to less than 95% by volume.

(Mixture Gas)

The mixture gas used in the present invention is obtained by concentrating carbon dioxide directly from the atmosphere and capturing concentrated carbon dioxide using the capturing unit.

In the present invention, it is preferable that in the captured mixture gas, substances other than carbon dioxide are components (harmless) originating from the atmosphere. The mixture gas of carbon dioxide directly concentrated from the atmosphere tends to have a low purity of carbon dioxide, but substances (impurities) other than carbon dioxide are components originating from the atmosphere, such as nitrogen and oxygen, and are environment-friendly substances.

In addition, in the first aspect of the present invention, the capturing unit adjusts the proportion of carbon dioxide in the mixture gas to 25% by volume or more such that the capturing cost can be lowered.

According to the present invention, the mixture gas may comprise substances other than carbon dioxide. Carbon dioxide captured from sources other than the atmosphere (such as power plants) may contain SOx and NOx as substances other than carbon dioxide. Meanwhile, according to the present invention, it is preferable that in a case in which the mixture gas contains substances other than carbon dioxide, the substances do not include SOx and NOx. In this case, it is more preferable that the mixture gas further comprises nitrogen and oxygen as the substances other than carbon dioxide. The total proportion of carbon dioxide, nitrogen, and oxygen in the mixture gas is preferably 90% by volume or more, more preferably 95% by volume or more, particularly preferably 99% by volume or more, further particularly preferably 99.5% by volume or more.

(Structure of Capturing Unit)

In the present invention, the method for concentrating carbon dioxide directly from the atmosphere and capturing concentrated carbon dioxide, namely the direct air capture method, is not particularly limited. Examples of thereof include the direct air capture (membrane-DAC; m-DAC) method for concentrating carbon dioxide directly from the atmosphere using a gas separation membrane and the direct air capture method based on the use of an adsorbent (such as the method described in JP Patent No. 5462786 mentioned above). The direct air capture based on the use of an adsorbent involves repeating the adsorption of carbon dioxide and the release of carbon dioxide by heating the adsorbent, during which the desorption process that releases carbon dioxide from the adsorbent requires considerable energy.

According to the present invention, it is preferable that the capturing unit directly concentrates carbon dioxide from the atmosphere using a gas separation membrane, and it is more preferable that the capturing unit comprises a carbon dioxide separation membrane module from the viewpoint of lowering the cost of capturing carbon dioxide.

A preferred embodiment in which the capturing unit comprises a carbon dioxide separation membrane module may be described herein; however, the capturing unit in the present invention is not limited to such a case in which the capturing unit comprises a carbon dioxide separation membrane module.

It is preferable that a carbon dioxide separation membrane module comprises at least a carbon dioxide gas separation membrane. The number of carbon dioxide gas separation membranes through which air passes may be one or two. However, the smaller the number, the better because it requires less separation and capturing operations. One carbon dioxide gas separation membrane is preferable. Also, in a case in which the apparatus for injecting carbon dioxide comprises a plurality of capturing units, the number of carbon dioxide gas separation membranes through which air passes may be one or two in each capturing unit. Still, one carbon dioxide gas separation membrane is preferable. According to the present invention, in the carbon dioxide separation membrane module, a multi-step process involving repeating the passage of air through a carbon dioxide gas separation membrane may be carried out; however, it is preferably a process involving the passage of air through only one carbon dioxide gas separation membrane.

Examples of the carbon dioxide gas separation membrane include a permselective membrane. According to the present invention, it is preferable that when separating carbon dioxide from a fluid such as the atmosphere, at least one carbon dioxide gas separation membrane quickly permeates carbon dioxide relative to nitrogen and has a high permeability coefficient ratio ($CO_2/N_2$). It is also preferable that when separating carbon dioxide from a fluid such as the atmosphere, at least one carbon dioxide gas separation membrane quickly permeates carbon dioxide relative to oxygen and has a high permeability coefficient ratio ($CO_2/O_2$). It is preferable that when separating carbon dioxide from a fluid such as the atmosphere, at least one carbon dioxide gas separation membrane quickly permeates carbon dioxide relative to oxygen and nitrogen and has a high $CO_2/O_2$ permeability coefficient ratio and a high $CO_2/N_2$ permeability coefficient ratio. The carbon dioxide gas separation membrane is not particularly limited. For example, carbon dioxide gas separation membranes such as one disclosed in JP 2000-093770 A (Paragraphs [0010] to [0089]), which is incorporated herein by reference, can be employed.

According to the present invention, since carbon dioxide is directly captured from the atmosphere, there is no need to carry out a separate process for removing harmful components such as NOx and SOx in a carbon dioxide gas separation membrane.

In a case in which carbon dioxide is separated from the atmosphere to capture a mixture gas in a multi-step process involving repeating the passage of air through a carbon dioxide gas separation membrane, the carbon dioxide concentration in the resulting mixture gas captured varies depending on the types and number of gas separation membranes. According to the present invention, since it was found that a mixture gas containing carbon dioxide at a proportion of 25% by volume or more can be stored underground, direct air capture via a gas separation membrane can be easily employed.

The capturing unit using a carbon dioxide separation membrane module does not require the use of a chemical sorbent; thus, it can be smaller in size than a capturing unit for direct air capture based on the use of a sorbent and is easily disposed near the injection well and the reservoir.

The apparatus for injecting carbon dioxide into underground is not particularly limited in the number of capturing units; thus, it may have at least one capturing unit.

The number of capturing units to be disposed is preferably 2 or more, more preferably from 3 to 100, particularly preferably from 5 to 20 from the viewpoint of increasing the amount of carbon dioxide captured. In the case of disposing two or more capturing units, it is preferable to arrange capturing units in parallel in a distributed form of capturing units such that a plurality of capturing units are connected to one injection well. The aspect of the distributed form of capturing units is similar to a photovoltaic system including distributed panels, allowing the capturing unit of a ubiquitous carbon dioxide capturing system to be configured.

According to the present invention, the capturing unit may comprise both a capturing unit for direct air capture via a gas separation membrane (m-DAC) for capturing low-purity carbon dioxide and a capturing unit for direct air capture based on the use of an adsorbent for capturing high-purity carbon dioxide. In this case, a capturing unit for direct air capture via a gas separation membrane may be disposed together with a thermal power plant or factory provided with a capturing unit for direct air capture based on the use of an adsorbent or the like.

In a case in which a capturing unit is located on the sea, the capturing unit may be disposed with an offshore wind energy plant or offshore photovoltaic power plant. The apparatus for injecting carbon dioxide into underground of the present invention, which is integrated with an offshore wind energy plant or offshore photovoltaic power plant, is preferable from the viewpoint that combining natural energy utilization technology with negative emission technology makes it easier to reduce the concentration of carbon dioxide in the atmosphere. An offshore platform may be constructed on the ocean, and a capturing unit and an injection well may be disposed on this offshore platform.

The capturing unit may have a storage unit for temporarily injecting the captured mixture gas. In addition, the capturing unit may have a valve for temporarily stopping the flow of the captured mixture gas into the injection well.

(Locations of Capturing Unit)

The location of the capturing unit is not limited in the present invention. An apparatus comprising a capturing unit configured to capture carbon dioxide directly from the exhaust gas of a factory has been known as a conventional apparatus for injecting carbon dioxide into underground. The factory is often located in an urban area or suburb. Therefore, the capturing unit of a conventional apparatus for injecting carbon dioxide into underground is often located in an urban area or suburb. Meanwhile, the injection well and reservoir of the apparatus for injecting carbon dioxide into underground need to be located at a site away from an urban area, resulting in a high cost of transporting a carbon dioxide-enriched mixture gas from the capturing unit to the injection well.

On the other hand, as the apparatus for injecting carbon dioxide into underground of the present invention can capture carbon dioxide directly from the atmosphere, the capturing unit may be located in an urban area or suburb or at a site away from an urban area. Preferably, the capturing unit should be located at a site away from an urban area from the viewpoint of lowering the cost of transporting a mixture gas from the capturing unit to the injection well and obtaining understanding from residents. Examples of a site away from an urban area include a non-residential area (far away from a residential area), a non-industrial area, a suburb, a desert, and a site on the sea.

According to the present invention, it is particularly preferable that the capturing unit is located in a non-residential area or a non-industrial area on the ground or the capturing unit is located on the sea.

<Injection Well>

The apparatus for injecting carbon dioxide into underground of the present invention comprises an injection well for pressurizing a mixture gas and injecting the mixture gas into an underground reservoir, which is connected to the capturing unit, Preferably, the injection well comprises a carbon dioxide pumping apparatus and a pipe connecting the capturing unit and the carbon dioxide pumping apparatus. The pipe connecting the capturing unit and the carbon dioxide pumping apparatus shall be under negative pressure and may suck a mixture gas from the capturing unit toward the carbon dioxide pumping apparatus.

In addition, it is preferable that the injection well (well portion) reaches from the carbon dioxide pumping apparatus to the reservoir. The number of such injection wells (well portions) may be one, or two or more.

The carbon dioxide pumping apparatus does not need to dissolve a mixture gas in a different solvent in the case of pressurizing the mixture gas. Note that a mixture gas may be pressurized to a liquid form or a supercritical state and then pumped, or a mixture gas may be made in a liquid form or a supercritical state while passing through the injection well.

Here, pure carbon dioxide exists in one of four phases, gas, liquid, solid, and supercritical, depending on pressure and temperature conditions. In addition, carbon dioxide becomes solid dry ice at a temperature of 194K (−79.15° C.) or less under normal pressure, but it is known that when mixed with water, it hydrates (solidifies) under different temperatures and pressure conditions. Carbon dioxide hydrate is produced by mixing liquid carbon dioxide with water at a temperature of 10° C. or lower and a pressure of 4.5 MPa or higher and overlaps part of the liquid carbon dioxide region (liquid phase region). In addition, the density of carbon dioxide changes with increasing pressure due to gas-liquid phase change. However, since carbon dioxide enters a supercritical state at a temperature of 31° C. or higher and a pressure of 7.4 MPa or higher, the change in density due to a further increase in pressure is relatively slow (see JP 2019-126787 A (Paragraph [0003]).

The mixture gas containing carbon dioxide at 25% by volume or more used in the present invention exists in one of the four phases, namely gas, liquid, solid, and supercritical phases, depending on the conditions of pressure and temperature, although the details of the phase equilibrium diagram are not known. According to the present invention, it is preferable to inject a mixture gas in a liquid or supercritical state while preventing the mixture gas from hydrating (solidifying) until the mixture gas reaches from the injection well to the reservoir so as to store the mixture gas in a supercritical state in the reservoir. Note that in a case in which the proportion of carbon dioxide in the mixture gas is low, the mixture gas may be store in a liquid state in the reservoir. As used herein matter originating from the mixture gas stored in the reservoir is also referred to as “mixture fluid.” Preferably, the proportions of carbon dioxide in such mixture gas and mixture fluid and the depth of the reservoir are calculated by a program described later.

Preferably, the apparatus for injecting carbon dioxide into underground of the present invention employs a method for capturing a water-free mixture gas and injecting the mixture gas as a mixture fluid. In other words, it is preferable that the apparatus for injecting carbon dioxide into underground of the present invention differs from an apparatus for injecting carbon into dioxide underground that employs a dissolution storage method for dissolving captured carbon dioxide in water and injecting the resulting carbonated water.

(Positional Relationship Between Capturing Unit and Injection Well)

According to the present invention, it is preferable that the capturing unit and the injection well are in close proximity from the viewpoint of lowering the cost of transporting a mixture gas between the capturing unit and the injection well.

According to the present invention, the horizontal distance between the capturing unit and the injection well is preferably 500 m or less, more preferably 100 m or less. It is particularly preferable that the capturing unit and the injection well are horizontally co-located. In this case, an injection tube for the injection well is preferably a vertical or inclined well extending in a vertical direction of ±30°, more preferably a vertical or inclined well extending in a vertical direction of ±10°, particularly preferably a vertical well extending in a vertical direction of ±1°. The injection well may be a vertical well combined with a horizontal well or an inclined well (such as an L-shaped cross section). In a case in which an geological formation suitable for storage is obvious, a horizontal well or an inclined well along with the geological formation is preferable.

(Reservoir)

According to the present invention, the reservoir stores a mixture fluid originating from a mixture gas. The reservoir is not particularly limited.

Examples of the reservoir can include a water area (e.g., a geological formation rich in groundwater described in JP 2012-519587 A) and a pore space inside a rock constituting a geological formation of a (depleted) oil or gas reservoir.

According to the present invention, it is preferable that a mixture fluid is stored in rock voids in the reservoir. Rock voids from which hydrocarbons have been extracted are more preferable from the viewpoint that a large amount of carbon dioxide can be stored safely. Shale gas exists when methane is adsorbed on shale or the coal layer, which are regarded as petroleum source rocks, and it is known that carbon dioxide is also adsorbed thereto. In addition, conventional natural gas is present in a geological formation in which highly airtight cap rocks such as mudstone function as a sealing layer. Methane hydrate exists with a sealing layer formed by the conditions of hydration temperature and pressure. After these gases are extracted, the natural sealing function is used to store the mixture fluid in rock voids.

The stored mixture fluid may be mineralized. The mineralization of the mixture fluid is not particularly limited. For example, the mineralization of stored carbon dioxide by precipitation of carbonate minerals is believed to take hundreds to thousands of years in the natural environment. In some cases, over 95% of carbon dioxide injected into basalt can be converted to stable carbonate minerals within two years. Carbon dioxide can be stored efficiently and safely by investigating the rate of CO mineralization in the reservoir and controlling $CO_2$ storage and the injection rate.

Here, it is common that high-purity (99% by volume or more) carbon dioxide is injected into a reservoir at a depth slightly deeper than 800 m from the surface of the earth. At such depths, high-purity carbon dioxide is in a supercritical state, approximately 600 times denser than the gas phase at pressures typical of these depths (>7.38 MPa). Therefore, a large amount of high-purity carbon dioxide is stored underground in the limited pore space.

On the other hand, according to the present invention, a mixture fluid originating from a mixture gas of low-purity (25% by volume or more) carbon dioxide is stored underground. In the case of the present invention, it is preferable that the reservoir is at a depth deeper than that of the reservoir for high-purity carbon dioxide (at a depth of from 800 m to 1.0 km from the surface of the earth) from the viewpoint of increasing pressure applied to the mixture gas or mixture fluid to facilitate a supercritical state.

The underground storage apparatus of the present invention may have a combination of at least one injection well for a deep low-purity carbon dioxide reservoir and one or more injection wells for a shallow high-purity carbon dioxide reservoir as a hybrid injection well. In this case, it is preferable to provide a separation distance from the end of the injection well for a shallow high-purity carbon dioxide reservoir to the end of the injection well for a deep low-purity carbon dioxide reservoir.

It is assumed that the geological formation of each reservoir is almost horizontal in the stratification structure. This makes it possible to efficiently utilize the underground space by shifting the depth of the end of each injection well.

It is preferable that a reservoir is at a depth of 1.5 km or more from the surface of the earth from the viewpoint that facilitating a mixture gas containing carbon dioxide at a proportion of 25% by volume or more (especially from 50% to 95% by volume) to be in a supercritical state.

According to the present invention, in a case in which the capturing unit is located on the ground, the reservoir is located at a depth of preferably 1.5 km or more, more preferably 2.0 km or more, particularly preferably 2.5 km or more from the surface of the earth. Meanwhile, the reservoir may be located at a depth of 3.0 km from the surface of the earth.

According to the present invention, in a case in which the capturing unit is located on the sea, the reservoir is located preferably in a geological formation present at a depth of 1.5 km or more, particularly preferably in a geological formation present at a depth of 2.0 km or more, further particularly preferably in a geological formation present at a depth of 2.5 km or more from the sea surface. Meanwhile, the reservoir may be located at a depth of 3.0 km from the surface of the earth. In addition, in a case in which carbon dioxide is stored under the seafloor, it results in a higher ambient pressure at the same depth than in continental soil. Thus, when the capturing unit is located on the sea, the reservoir is located at a depth of preferably 0.8 km or more, more preferably from 0.8 to 2.0 km, particularly preferably from 0.8 to 2.5 km from the seafloor based on the seafloor. There are many depleted hydrocarbon reservoirs available on the seafloor, which can be utilized as reservoirs in the present invention.

According to the present invention, a mixture fluid in the reservoir has a density (similar to partial pressure, which can be thought of as partial density) of pressurized carbon dioxide in the reservoir at from 50 to 500 $kg/m^3$. The density of pressurized carbon dioxide in the reservoir is preferably 100 $kg/m^3$ or more, particularly preferably 300 $kg/m^3$ or more, further particularly preferably 400 $kg/m^3$ or more. In the case of pure carbon dioxide, the density in a supercritical state is about 680 $kg/m^3$ under typical conditions (a depth of 1.5 km from the surface of the earth, 52.5° C., 15 MPa) for the reservoir used in the present invention.

Meanwhile, the higher the density of pressurized carbon dioxide in the reservoir, the more preferable the supercritical state. However, by reducing the capturing cost according to the scale of the capturing unit and membrane separation performance, the cost of capturing the mixture gas, the cost of transportation from the capturing unit to the injection well, and the total storage cost may be reduced. In this case, a mixture gas containing carbon dioxide having a lower purity can be stored, during which the density of carbon dioxide in the reservoir may be 400 kg/$m^3$ or less, 300 kg/$m^3$ or less.

<Monitoring Unit>

Preferably, the apparatus for injecting carbon dioxide into underground of the present invention further comprises a monitoring unit configured to monitor the state of a mixture fluid in the reservoir.

According to the "Order for Enforcement of the Law Concerning Prevention of Marine Pollution, Etc. and Maritime Disasters," it is required to monitor the state of pollution caused by specific carbon dioxide gas in sea areas where specific carbon dioxide gas is disposed of under the seafloor. Hence, it is particularly preferable that in a case in which the reservoir is under the seafloor, the monitoring unit is integrated with the apparatus for injecting carbon dioxide into underground of the present invention.

In addition, components of the mixture fluid resulting from mixing may separate in the reservoir during long-term storage. For instance, since the critical point pressures of nitrogen (3.39 MPa) and oxygen (5.04 MPa) are lower than that of carbon dioxide (7.38 MPa), at a given pressure, carbon dioxide is a gas, whereas nitrogen and oxygen become a supercritical fluid. It is more preferable that the monitoring unit monitors the state of a mixture fluid in the reservoir. It is preferable to create a phase equilibrium diagram of pressure and temperature for the mixture fluid to be stored. The phase equilibrium diagram of the mixture fluid may be created by a program described later.

The monitoring unit is not particularly limited, and a known monitoring system can be employed. Since supercritical carbon dioxide, nitrogen, and oxygen are much less dense than formation water, for example, a system of repetitive seismic surveys (time-lapse surveys) may be used as a monitoring unit. In addition, a continuous monitoring system may be used as a monitoring unit. Examples of a continuous monitoring system can include an ultra-dense seismometer array tens of kilometers in length using a fiber optic cable and a distributed acoustic sensor.

<Recovery Unit>

Preferably, the apparatus for injecting carbon dioxide into underground of the present invention further comprises a recovery unit that recovers carbon dioxide from the reservoir.

Preferably, the recovery unit recovers carbon dioxide having an increased concentration due to separating carbon dioxide from the mixture fluid stored in the reservoir.

The recovered carbon dioxide may be used as an industrial product or as a resource.

The configuration of the recovery unit is not limited. For example, as shown in FIG. 1, it is preferable that the recovery unit comprises a well (vertical well), equipment for processing the recovered carbon dioxide into an industrial product or the like, and equipment for stockpiling the carbon dioxide as a resource.

<Release Unit>

From the viewpoint of maintaining a space of the reservoir (pores inside a rock), it is preferable that the apparatus for injecting carbon dioxide into underground of the present invention further comprises a release unit configured to release oxygen and nitrogen from the reservoir to the atmosphere. In a case in which the mixture fluid separates, it is preferable to capture and release oxygen and nitrogen into the atmosphere, similar to natural gas production.

Preferably, the release unit releases oxygen and nitrogen separated from the mixture fluid stored in the reservoir.

The release unit is not particularly limited. For example, a release unit known in the art of natural gas production can be used.

<CPU>

In the second aspect of the present invention, the apparatus for injecting carbon dioxide into underground comprises a CPU. The CPU obtains the proportion of carbon dioxide in the mixture gas using a program stored in a memory unit such that a density of pressurized carbon dioxide in the reservoir based on a depth of the reservoir is within a predetermined range.

As long as the density of pressurized carbon dioxide in the reservoir is within the predetermined range, the volume of the mixture gas is sufficiently reduced, thereby allowing the storage cost to be lowered to a competitive range.

Note that the density of a mixture gas containing low-purity carbon dioxide gradually increases with an increase in the proportion of carbon dioxide; thus, storage of low-purity carbon dioxide results in lower efficiency than storage of high-purity carbon dioxide.

In calculation when the CPU obtains the proportion of carbon dioxide in the mixture gas, parameters such as the depth of the reservoir, the temperature and pressure of the injection well or reservoir, and the proportions of non-carbon dioxide components of the mixture gas are used.

<Memory Unit>

In the second aspect of the present invention, the apparatus for injecting carbon dioxide into underground comprises a memory unit, which stores a program.

The program only needs to be able to calculate the density of the pressurized carbon dioxide in the reservoir based on the depth of the reservoir. Preferably, the program can also calculate the density of the pressurized mixture gas and the densities of the non-carbon dioxide components in the reservoir based on the depth of the reservoir and other parameters. In the present invention, a depth of 1.5 km from the surface of the earth, 52.5° C., and 15 MPa may be used as typical conditions for the reservoir. It is preferable to allow the memory unit to store the typical conditions for the reservoir.

Examples of programs used can include molecular dynamics simulations or programs based on the results to evaluate the density of low-purity carbon dioxide at pressure and temperature conditions typical of the reservoir. Such programs allow the estimation of the efficiency of geological storage of low-purity carbon dioxide. In the present invention, since the mixture gas captured by the capturing unit is highly likely to contain not only carbon dioxide as the main component but also nitrogen and oxygen, the target composition is a $CO_2$—$N_2$—$O_2$ mixture. For example, given a fixed temperature and pressure, the density of the $CO_2$—$N_2$—$O_2$ mixture pressurized and the density of pressurized carbon dioxide in the reservoir at a specific depth (e.g., 1.5 km) from the surface of the earth can be calculated.

Software used for molecular dynamics simulation is not particularly limited, and known software can be used.

<Control Unit>

In the second aspect of the present invention, the apparatus for injecting carbon dioxide into underground comprises a control unit, in which the degree of concentration of carbon dioxide in the capturing unit is controlled so as to match the proportion of carbon dioxide in the mixture gas obtained by the control unit.

In a case in which the capturing unit includes a gas separation membrane module, it is preferable that the control unit changes the number and types of gas separation membranes in the capturing unit (high or low carbon dioxide permeability coefficient) such that they match the degree of concentration of carbon dioxide. In general, as the number of gas separation membranes through which the atmosphere passes increases, carbon dioxide can be concentrated and the proportion of carbon dioxide in the mixture gas can be increased.

The control unit may be connected to the monitoring unit by wire or wirelessly.

The control unit may further control the injection well as well as the capturing unit. For example, the monitoring unit monitors the mineralization rate of carbon dioxide (or mixture fluid) in the reservoir with a sensor or the like, thereby making it possible to control the injection well concerning the amount of carbon dioxide stored and the injection rate.

[Method for Evaluating Apparatus for Injecting Carbon Dioxide into Underground]

The "method for evaluating an apparatus for injecting carbon dioxide into underground" of the present invention is a method for evaluating "the apparatus for injecting carbon dioxide into underground of the present invention," the method comprising calculating the density of pressurized carbon dioxide in the reservoir so as to obtain storage efficiency of carbon dioxide based on the proportion of carbon dioxide in the mixture gas and the depth of the reservoir.

The calculation means is not particularly limited, and a simulation similar to the program in the memory unit in the second aspect of the present invention or a program based on the results thereof can be used. In addition, the density of pressurized carbon dioxide in the reservoir may be calculated using parameters such as the temperature and pressure of the injection well or reservoir and the proportions of non-carbon dioxide components of the mixture gas, in addition to the proportion of carbon dioxide in the mixture gas and the depth of the reservoir.

In addition to the density of pressurized carbon dioxide in the reservoir (distribution density), the density of the pressurized mixture gas in the reservoir area may also be calculated.

The density of pressurized carbon dioxide in the reservoir may be converted into the carbon dioxide storage efficiency as it is or may be converted into the carbon dioxide storage efficiency in consideration of the void ratio of the reservoir.

[Method for Producing Apparatus for Injecting Carbon Dioxide into Underground]

The "method for producing an apparatus for injecting carbon dioxide into underground" of the present invention is a method for producing "the apparatus for injecting carbon dioxide into underground of the present invention," the method comprising:

- calculating a total cost of a cost for capturing the mixture gas in a case in which the capturing unit adjusts the proportion of carbon dioxide in the mixture gas to 99% by volume, a cost for transporting the mixture gas from the capturing unit to the injection well, and a cost for injecting the mixture gas,
- determining (1) the proportion of carbon dioxide in the mixture gas; (2) the horizontal distance between the capturing unit and the injection well; and (3) the depth of the reservoir so that the cost is equal to or less than the total cost.

In calculating the cost, it may be assumed that the storage cost per mole of gas is the same for all compositions or slightly different for each composition.

For instance, assuming that the reservoir has a certain depth in (3), the storage cost for a mixture gas with a carbon dioxide proportion of 80% by volume is calculated to be twice that of a mixture gas with a carbon dioxide proportion of 99% by volume. Further, it is assumed that the cost of transportation from the capturing unit to the injection well is the same regardless of the carbon dioxide proportion of the mixture gas. Then, the apparatus for injecting carbon dioxide into underground of the present invention can be produced at a low cost by determining "(1) the proportion of carbon dioxide in the mixture gas" such that the capturing cost when the proportion of carbon dioxide in the mixture gas is 80% by volume is adjusted to be half or less of the cost when the proportion of carbon dioxide in the mixture gas is 99% by volume. Note that "(1) the proportion of carbon dioxide in the mixture gas" and the capturing cost are controlled by the size of the capturing unit and the method of direct air capturing (e.g., the number of gas separation membranes in the gas separation membrane module).

Meanwhile, when the proportion of carbon dioxide in the mixture gas is adjusted to 99% by volume, the capturing unit is usually located in a city area or a suburb, and the injection well is located away from the city area, resulting in a high cost of transportation from the capturing unit to the injection well. The cost of transportation from the capturing unit to the injection well in a conventional direct air capturing system is estimated at about 25% of the total cost, depending on the transportation distance.

According to the present invention, both the capturing unit and the injection well are located away from a city area, and "(2) the horizontal distance between the capturing unit and the injection well" is determined to be short such that the cost of transportation from the capturing unit and the injection well is significantly lowered. Thus, the apparatus for injecting carbon dioxide into underground of the present invention can be produced. Accordingly, "(1) the proportion of carbon dioxide in the mixture gas" and "(3) the depth of the reservoir" can be elastically varied so as to design a low-cost apparatus for injecting carbon dioxide into underground.

Regarding "(3) the depth of the reservoir," carbon dioxide can sometimes be stored in a highly porous shallow geological formation at a site away from a city area. The carbon dioxide density decreases in a shallow geological formation, which usually results in a high storage cost. However, the storage cost may be lowered in the case of a geological formation for which the injection well is short, the injection pressure is low, and the void ratio is high. Therefore, the apparatus for injecting carbon dioxide into underground can be designed such that carbon dioxide can be stored in an abundant pore space in a remote shallow geological formation in a desert, a depleted offshore oil reservoir, or the like.

In addition, "(3) the depth of the reservoir" is determined to be shallow for small-scale storage of low-purity carbon dioxide captured by a small-sized capturing unit (such as m-DAC) to reduce the capturing cost such that the apparatus for injecting carbon dioxide into underground can be designed at a low cost.

The "method for producing an apparatus for injecting carbon dioxide into underground" of the present invention may determine the location of a reservoir (4). The density of carbon dioxide increases at lower temperatures. Therefore, as the temperature of the environment depending on the location of the reservoir decreases, it becomes possible to improve the storage efficiency of carbon dioxide and reduce the storage cost.

In the case of injecting carbon dioxide into underground on the seafloor, as the ambient pressure is higher at the same depth than on land, the storage cost may be reduced. Therefore, as the pressure of the environment depending on the location of the reservoir increases, it becomes possible to improve the storage efficiency of carbon dioxide and reduce the storage cost.

REFERENCE SIGNS LIST

1 Apparatus for injecting carbon dioxide into underground
2 Capturing unit
3 Injection well
4 Reservoir
5 Mixture gas
6 Recovery unit
7 Release unit
11 CPU
12 Memory unit
13 Control unit
14 Input unit
21 Program

The invention claimed is:

1. An apparatus for injecting carbon dioxide into underground, the apparatus comprising:

a capturing unit configured to concentrate carbon dioxide directly from an atmosphere and capture concentrated carbon dioxide as a mixture gas;

an injection well for pressurizing the mixture gas and injecting the mixture gas into an underground reservoir, which is connected to the capturing unit;

a CPU;

a memory unit; and a control unit, wherein the CPU obtains the proportion of carbon dioxide in the mixture gas using a program stored in the memory unit such that a density of pressurized carbon dioxide in the reservoir based on a depth of the reservoir is within a predetermined range, and said control unit controls a degree of concentration of carbon dioxide in the capturing unit so as to match the proportion of carbon dioxide in the mixture gas obtained by said CPU.

2. The apparatus for injecting carbon dioxide into underground according to claim 1, wherein the capturing unit adjusts the proportion of carbon dioxide in the mixture gas to 25% by volume to 95% by volume.

3. The apparatus for injecting carbon dioxide into underground according to claim 1, wherein the capturing unit concentrates carbon dioxide directly from the atmosphere using a gas separation membrane.

4. The apparatus for injecting carbon dioxide into underground according to claim 1 wherein a mixture fluid originating from the mixture gas is stored in a pore space inside a rock in the reservoir.

5. The apparatus for injecting carbon dioxide into underground according to claim 1, wherein the capturing unit is located in a non-residential area or a non-industrial area on the ground, and the reservoir is located at a depth of 1.5 km or more from the surface of the earth.

6. The apparatus for injecting carbon dioxide into underground according to claim 1, wherein the capturing unit is located on the sea, and the reservoir is located in a geological formation at a depth of 1.5 km or more from the sea surface.

7. The apparatus for injecting carbon dioxide into underground according to claim 1, wherein the density of pressurized carbon dioxide in the reservoir is from 50 to 500 $kg/m^3$.

8. The apparatus for injecting carbon dioxide into underground according to claim 1, wherein a horizontal distance between the capturing unit and the injection well is 500 m or less.

9. The apparatus for injecting carbon dioxide into underground according to claim 1, wherein the reservoir further comprises a monitoring unit that monitors a state of a mixture fluid originating from the mixture gas.

10. The apparatus for injecting carbon dioxide into underground according to claim 1, which further comprises a recovery unit configured to recover carbon dioxide from the reservoir.

11. The apparatus for injecting carbon dioxide into underground according to claim 1, wherein the mixture gas further contains nitrogen and oxygen, and a total proportion of carbon dioxide, nitrogen, and oxygen in the mixture gas is 99% by volume or more.

12. The apparatus for injecting carbon dioxide into underground according to claim 1, wherein the mixture gas further contains nitrogen and oxygen, and the total proportion of carbon dioxide, nitrogen, and oxygen in the mixture gas is 99% by volume or more, and the apparatus further comprises a release unit that releases oxygen and nitrogen from the reservoir to the atmosphere.

13. A method for evaluating an apparatus for injecting carbon dioxide into underground, said apparatus comprising:

a capturing unit configured to concentrate carbon dioxide directly from the atmosphere and capture concentrated carbon dioxide as a mixture gas; and an injection well for pressurizing the mixture gas and injecting the mixture gas into an underground reservoir, which is connected to the capturing unit, wherein the capturing unit adjusts a proportion of carbon dioxide in the mixture gas to 25% by volume or more, said method comprising:

calculating the density of pressurized carbon dioxide in the reservoir so as to obtain storage efficiency of carbon dioxide based on the proportion of carbon dioxide in the mixture gas and the depth of the reservoir.

14. A method for producing an apparatus for injecting carbon dioxide into underground, said apparatus comprising:

a capturing unit configured to concentrate carbon dioxide directly from the atmosphere and capture concentrated carbon dioxide as a mixture gas; and an injection well for pressurizing the mixture gas and injecting the mixture gas into an underground reservoir, which is connected to the capturing unit, wherein the capturing unit adjusts a proportion of carbon dioxide in the mixture gas to 25% by volume or more, said method comprising:

calculating a total cost of a cost for capturing the mixture gas in a case in which the capturing unit adjusts the proportion of carbon dioxide in the mixture gas to 99% by volume, a cost for transporting the mixture gas from the capturing unit to the injection well, and a cost for storing the mixture gas, and determining (1) the proportion of carbon dioxide in the mixture gas; (2) the horizontal distance between the capturing unit and the injection well; and (3) the depth of the reservoir so that the cost is equal to or less than the total cost.

* * * * *